United States Patent Office 3,576,908
Patented Apr. 27, 1971

3,576,908
CROSSLINKABLE COMPOSITION OF UNSATU-
RATED POLYMERS AND PRECURSOR OF A
POLYFUNCTIONAL NITRILE N-OXIDE
Karl Brack, Wilmington, Del., assignor to Hercules
Incorporated, Wilmington, Del.
No Drawing. Continuation-in-part of application Ser. No.
811,203, Mar. 27, 1969. This application Feb. 20, 1970,
Ser. No. 13,175
Int. Cl. C08g 41/04
U.S. Cl. 260—858                                22 Claims

ABSTRACT OF THE DISCLOSURE

A cross-linkable composition is obtained by admixing an unsaturated polymer, a precursor of a polyfunctional nitrile N-oxide or nitrile imine compound and an ammonia- or amine-yielding compound selected from the group consisting of ammonia- or amine-yielding coordination compounds of certain metals, ammonia- or amine-yielding extra-coordinate siliconate salts and amine-yielding organic-substituted ammonium salts.

---

This application is a continuation-in-part of application Ser. No. 811,203 filed Mar. 27, 1969.

This invention relates to cross-linkable polymer compositions useful in sealants, adhesives, coatings, molding, casting, etc. and to a process of cross-linking said compositions. More particularly, this invention relates to cross-linkable unsaturated polymer compositions which cross-link on initiation with heat.

In the past, it has been known to prepare sealant, adhesive and coating formulations by merely dissolving a polymer in a volatile solvent. Such formulations, while acceptable for many applications, suffer serious drawbacks. For example, such formulations are subject to shrinkage due to evaporation of the solvent. Another disadvantage is the susceptibility of the resulting uncross-linked product to attack by solvents.

Now in accordance with this invention it has unexpectedly been found that compositions can be prepared which when heated, will cross-link to solid, insoluble products. Since the composition can be prepared without using any solvents, there is little or no shrinkage upon curing. Typical compositions of this invention contain an unsaturated polymer, a precursor of a polyfunctional nitrile N-oxide or nitrile imine compound and an ammonia- or amine-yielding compound selected from the group consisting of ammonia- or amine-yielding coordination compounds of certain metals, ammonia- or amine-yielding extra-coordinate siliconate salts and amine-yielding organic-substituted ammonium salts.

Any unsaturated polymer, containing ethylenic unsaturation wherein there is at least one hydrogen radical attached to at least one of the carbon atoms of the ethylenic double bond can be used in the compositions of this invention. Where fluid compositions are desired, unsaturated polymers having a molecular weight range of from about 1,000 to about 20,000 are preferred. However, higher molecular weight polymers can be used in conjunction with small amounts of solvents and/or plasticizers to obtain the desired fluidity. Typical unsaturated polymers that can be used are polybutadiene-1,2, polybutadiene-1,4, styrene-butadiene copolymers, isobutylene-isoprene copolymers, natural rubber, polyester resins, such as maleate- and fumarate-containing polyesters and unsaturated acrylate copolyesters, butadiene-acrylonitrile copolymers, ethylene-propylene-dicyclopentadiene terpolymers, polychloroprene, polyisoprene, unsaturated polyurethanes, unsaturated alkyd resins such as tall oil alkyd resins, polyether copolymers and terpolymers containing at least two unsaturated epoxide constituents such as propylene oxide-allyl glycidyl ether copolymers and ethylene oxide-epichlorohydrin-allyl glycidyl ether terpolymers, etc. and blends of these polymers with each other. In addition to the olefinically unsaturated polymers, polymers containing acetylenic unsaturation can be used. In some cases it may be desirable to use partially hydrogenated products of the above unsaturated polymers.

Any precursor of a polyfunctional nitrile N-oxide or nitrile imine compound having the formula selected from the group consisting of

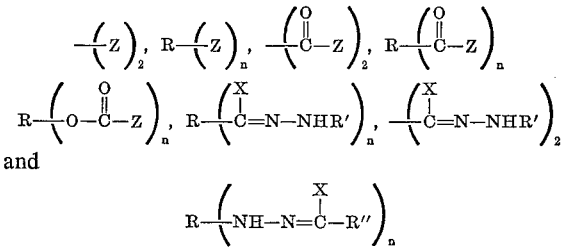

and

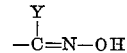

where Z is $$-\overset{Y}{\underset{|}{C}}=N-OH$$

Y is $-NO_2$ or a halide radical, i.e., fluorine, chlorine, bromine or iodine, R is an organic radical having a valence greater than 1, generally 2–10, R' is selected from the group consisting of the hydrogen and monovalent hydrocarbon radicals, R'' is a monovalent hydrocarbon radical, X is a halide radical and $n$ is an integer greater than 1, preferably 2–10.

Generally, R will be selected from the group consisting of the hydrocarbon, halide substituted hydrocarbon, hydrocarbonoxy - hydrocarbon, hydrocarbon-thio-hydrocarbon and hydrocarbon-sulfonyl-hydrocarbon polyvalent radicals. In preferred embodiments of this invention R is a divalent hydrocarbon radical selected from the group consisting of alkylene radicals such as, for example, ethylene, trimethylene, tetramethylene, pentamethylene, hexamethylene, octamethylene, decamethylene, dodecamethylene, octadecamethylene, and the like; arylene radicals such as o-, m-, p-phenylene, halogenated o-, m-, p-phenylene, biphenylene, naphthylene, and the like; cycloalkylene radicals such as cyclohexylene, cyclopentylene, cyclooctylene, cyclobutylene, and the like; arylene-dialkylene radicals suchas o-, m-, p-xylylene, o-, m-, p-phenylene diethylene and the like; alkylene-diarylene radicals such as methylene bis(o-, m-, p-phenylene), ethylene bis (o-, m-, p-phenylene), and the like; cycloalkylene-dialkylene radicals such as 1,2-, 1,3- and 1,4-cyclohexane dimethylene, 1,2- and 1,3-cyclopentane dimethylene and the like; alkylene oxy alkylene radicals such as ethylene oxy ethylene, and the like; arylene oxy arylene radicals such as phenylene oxy phenylene, and the like; alkarylene oxy alkarylene radicals such as methylene phenylene oxy methylene phenylene, and the like, and the corresponding thio and sulfonyl radicals such as ethylene thio ethylene, phenylene thio phenylene, phenylene methylene thio methylene phenylene, and butylene sulfonyl butylene, and the like.

Generally, the monovalent hydrocarbon radicals in the group from which R' and R'' are selected encompass alkyl radicals preferably containing 1–20 carbon atoms such as, for example, methyl, butyl, nonyl, decyl, pentadecyl, and the like; cycloalkyl radicals such as cyclopentyl, cyclohexyl, cyclooctyl, cyclododecyl, and the like; aryl radicals preferably having 1–3 rings such as phenyl, biphenyl, naphthyl, and the like; alkaryl radicals preferably having 1 or more alkyl groups containing 1–20 carbon atoms and 1–3 rings in the aryl group such as, for example, tolyl, octadecylnaphthyl, and the like; and similar aralkyl radicals, such as benzyl, naphthylhexamethylene, and the like.

Exemplary of the precursors of polyfunctional nitrile N-oxides and nitrile imines used in this invention are the poly-functional hydrazide halides such as, for instance, isophthaloyl-bis(phenylhydrazide chloride),
terephthaloyl-bis(phenylhydrazide chloride),
isophthaloyl-bis(methylhydrazide chloride),
isophthaloyl-bis(ethylhydrazide fluoride),
terephthaloyl-bis(methylhydrazide chloride),
terephthaloyl-bis(ethylhydrazide bromide),
succinoyl-bis(phenylhydrazide chloride),
adipoyl-bis(methylhydrazide chloride),
p-phenylene dipropionyl-bis(methylhydrazide chloride),
tetramethylene dibenzoyl-bis(butylhydrazide iodide),
N,N'-p-phenylene-bis(benzoyl hydrazide chloride),
N,N'-m-phenylene-bis(benzoyl hydrazide chloride),
glutaryl-bis(phenylhydrazide chloride),
1,4-cyclohexanedicarbonyl-bis(phenylhydrazide chloride),
trimesoyl-tris(phenylhydrazide chloride),
trimesoyl-tris(methylhydrazide chloride),
trimesoyl-tris(ethylhydrazide chloride),
trimellitoyl-tris(phenylhydrazide chloride),
trimesoyl-tris(methylhydrazide chloride),
pyromellitoyl-tetrakis(butylhydrazide chloride),
benzene pentacarbonyl-pentakis(phenylhydrazide chloride), and the like;

the poly(hydroximoyl halides), polyfunctional carbonylhydroximoyl halides, and polyfunctional nitrolic acids such as 2,3-dioxosuccinobis(hydroximoyl chloride),
methylene-bis(glyoxylohydroximoyl chloride),
ethylene-bis(glyoxylohydroximoyl chloride),
tetramethylene-bis(glyoxylohydroximoyl fluoride),
pentamethylene-bis(glyoxylohydroximoyl chloride),
1,2,3-propane-tris(glyoxylohydroximoyl chloride),
1,2,4-pentane-tris(glyoxylohydroximoyl chloride),
1,4-cyclohexane-bis(glyoxylohydroximoyl chloride),
p-phenylene-bis(acetohydroximoyl chloride),
2,2'-thia-bis(acetohydroximoyl chloride),
3,3'-thia-bis(propionohydroximoyl chloride),
isophthalo-bis(hydroximoyl chloride),
terephthalo-bis(hydroximoyl chloride),
4,4'-bis(benzohydroximoyl chloride),
4,4'-methylene-bis(benzohydroximoyl chloride),
4,4'-oxa-bis(benzohydroximoyl chloride),
3,3'-thia-bis(benzohydroximoyl chloride),
p-phenylene-bis(glyoxylohydroximoyl chloride),
4,4'-bis(phenylglyoxylohydroximoyl chloride),
4,4'-methylene-bis(phenylglyoxylohydroximoyl chloride),
the ethylene glycol,
tetramethylene glycol,
1,4-cyclohexylene glycol,
resorcinol, etc.,
esters of chloroximinoglyoxylic acid, etc.,
4,4'-methylene-bis(phenylglyoxylonitrolic acid),
m-phenylene-bis(glyoxylonitrolic acid),
4,4'-bis(phenylglyoxylonitrolic acid), etc.

These precursors can be prepared by several methods. For example, the poly(carbohydroximoyl halide)s having the formula R$\pm$(Z)$_n$ can be prepared by starting with a polyaldehyde having the desired nucleus such as succinaldehyde (butanedial), adipaldehyde (hexanedial), phthaldehyde (1,2-benzenedicarbonal), acrolein polymers, etc., treating the polyaldehyde with hydroxylamine to convert the aldehyde groups to oximes and then treating the resulting compound with a nitrosyl halide or halogen to convert the oxime groups to hydroximoyl halide groups. Polymers containing hydroximoyl halide groups can be prepared from acrolein polymers, as mentioned above, or by treating a bis(carbohydroximoyl halide) with ½ the calculated amount of base required to completely convert it to a bis(carbonitrile oxide) in the presence of a low molecular weight unsaturated polymer.

The polyfunctional carbonyl hydroximoyl halides having the formula

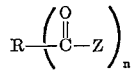

where Y is halogen, can be prepared from poly(haloketones). The haloketones are readily produced by the reaction of a poly(acylhalide) with diazomethane to yield a poly(diazoketone), which in turn, on treatment with a hydrogen halide, yields the desired poly(haloketones). Exemplary of the acid halides that can be converted to such poly(haloketones) are compounds having the formula XCO(CH$_2$)$_m$COX where X is halogen and $m$ is 0 to 10 or higher such as the acid halides of oxalic acid, malonic acid, succinic acid, adipic acid, sebacic acid, 1,2,3-propanetricarboxylic acid, 1,2,4-pentanetricarboxylic acid, etc., and other cycloaliphatic and aromatic polycarboxylic acids such as 1,4-cyclohexanedicarboxylic acid, 2-carboxyl-2-methylcyclohexane acetic acid, ethylene-acrylic acid copolymer, a partially hydrolyzed polyalkyl acrylate, diglycollic acid, p-phenylenediacetic acid, thiodiacetic acid, thiodipropionic acid, 4,4'-sulfonyldibutyric acid, phthalic acid, terephthalic acid, 4,4'-biphenyldicarboxylic acid, trimellitic acid, trimesic acid, naphthalic acid, etc.

Poly(haloacetyl) compounds wherein the haloacetyl groups are directly attached to an aromatic nucleus can also be prepared by introducing two or more haloacetyl groups by means of a normal Friedel-Crafts reaction. Another method is to chlorinate or brominate a polyacetyl aromatic compound in which reaction one chlorine or bromine is introduced into each methyl group. Typical of the poly(haloacetyl) compounds that can be prepared by one or more of these procedures are 1,4-bis(chloroacetyl) benzene, 1,3,5-tris(chloroacetyl) benzene, 4,4'-bis(bromoacetyl) biphenyl, 1,5-bis(chloroacetyl) naphthalene, 4,4'-bis(chloroacetyl) diphenyl ether, etc.

The haloacetyl compounds are then converted to the hydroximoyl halides by reaction with an alkyl nitrite and hydrogen halide under anhydrous conditions. Instead of an alkyl nitrite, other nitrosating agents can be used, as for example, N$_2$O$_3$, nitrosyl chloride, etc.

An alternative procedure for preparing the polyfunctional carbonylhydroximoyl halides having the formula

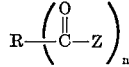

is to nitrosate an aliphatic or aromatic poly(methylketone) to produce a poly(oximinoketone) which on halogenation yields the poly(carbonylhydroximoyl halide).

The polyfunctional carbonyl nitrolic acids having the formula

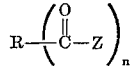

where Y is —NO$_2$ are prepared by the reaction of a poly(methylketone) with N$_2$O$_4$ which yields the poly(carbonylnitrolic acid) directly.

The polyfunctional carbonylhydroximoyl halides and carbonylnitrolic acids having the formula

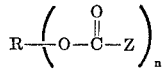

are derived from esters. The carbonylhydroximoyl halides having the above formula, where Y is halogen, are prepared by the reaction of an amino ester hydrochloride with sodium nitrite to form a diazo ester and converting the diazo ester with nitrous acid and a hydrogen halide to the hydroximoyl halide. Thus, for example, with glycine, or one of its precursors, such as aminoacetonitrile, it is possible to prepare a wide variety of glycinate esters from diols, triols, etc., which can then be converted by this route to the polyfunctional carbonylhydroximoyl halides. The carbonylnitrolic acids having the above formula where Y is —NO₂ are prepared from betaketoesters. For example, acetoacetic acid esters can be readily prepared by the reaction of diketene with polyols and then nitrosating the beta-ketoester with aqueous nitrous acid to yield the corresponding oximinoketoester. Treatment of these compounds with concentrated nitric acid gives the nitrolic acid in excellent yield, and treatment of the nitrolic acid with a hydrogen halide then yields the hydroximoyl halide. Actually, the reaction can be carried out in one step by reacting the oximinoketoester with a mixture of nitric acid and hydrogen halide to yield the hydroximoyl halide directly.

The polyfunctional hydrazide halides having the formula

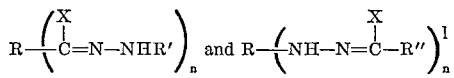

can readily be prepared by the reaction of phosphorous pentachloride with the corresponding acyl or aroyl hydrazide obtained by the reaction of carboxylic acid chlorides with appropriately substituted hydrazines. The reaction can be illustrated by the following equations:

$$R\text{-}(COCl)_n + nH_2NNHR' \rightarrow R\text{-}(CONHNHR')_n + nHCl$$

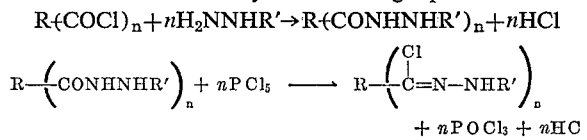

$$+ nPOCl_3 + nHC$$

In these equations, R, R' and n have the same definition as indicated above. Still other methods of preparing the precursors will be apparent to those skilled in the art.

The above-described precursors are converted to nitrile N-oxides or nitrile imines by the action of an amine or ammonia given off when an amine- or ammonia-yielding compound is heated. It is believed that the amine or ammonia acts by abstracting hydrogen halide from the precursor converting it to either a nitrile N-oxide or nitrile imine. The resulting nitrile N-oxide or nitrile imine in turn is believed to react with the double bonds of the polymer by way of 1,3-dipolar addition.

As indicated above ammonia- or amine-yielding compounds selected from the group consisting of ammonia- or amine-yielding metal coordination compounds, ammonia- or amine-yielding extra-coordinate siliconate salts and amine-yielding organic-substituted ammonium salts can be used in the process of this invention. Exemplary of the ammonia- or amine-yielding metal coordination compounds which can be used in accordance with this invention are the ammonia- or amine-yielding coordination compounds of the metals of atomic numbers 22 through 30. Typical of the metal coordination compounds are hexammine nickel tetrafluoroborate, hexammine cobalt (II) sulfate, aquapentammine cobalt (III) chloride hexammine titanium trichloride, hexammine vanadium trichloride, aquapentammine cobalt (III) sulfate, tetrammine copper (II) sulfate, hexammine manganese (II) dibromide, chloropentammine chromium (III) chloride, tris(ethylenediamine) chromium (III) sulfate, hexammine iron dichloride, tris(ethylenediamine) chromium (III) chloride, tetrammine zinc dichloride, tris(ethylenediamine) cobalt (III) chloride, di(ammine) bis(ethylenediamine) cobalt (III) chloride, etc.

The ammonia- or amine-yielding extra-coordinate siliconate salts which can be used in accordance with this invention have the general formula

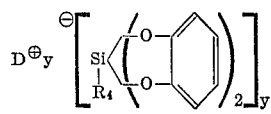

where R₄ is selected from alkyl, cycloalkyl, aryl, aralkyl and alkaryl radicals; y is an integer from 1 to 2; when y=1 D is a radical selected from

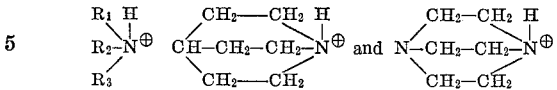

where R₁, R₂ and R₃ are selected from hydrogen, alkyl, cycloalkyl, aryl, aralkyl, and alkaryl radicals; when y=2 D is a radical selected from

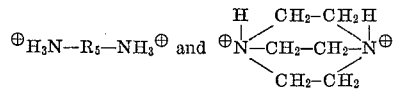

where R₅ is an alkylene radical containing 2 to 10 carbon atoms. Exemplary ammonia- or amine-yielding extra-coordinate siliconate salts which can be used in the process of this invention are triethylammonium di-(o-phenylenedioxy)phenylsiliconate, cyclohexylenediethylammonium di-(o-phenylenedioxy)phenylsiliconate, benzyldimethylammonium di(o-phenylenedioxy)phenylsiliconate, ethylenediammonium bis[di(o-phenylenedioxy)phenylsiliconate], butylenediammonium bis[di(o-phenylenedioxy)phenylsiliconate], triethylenediammonium bis[di(o-phenylenedioxy)phenylsiliconate], triethylammonium di (o-phenylenedioxy)methylsiliconate, 1-azoniabicyclo-[2,2,2]octane di(o-phenylenedioxy)phenylsiliconate, etc. The extra-coordinate siliconates can readily be prepared by reacting 1 mole of ammonia or an amine with 1 mole of an alkyl or aryltrimethoxysilane and 2 moles of pyrocatechol. The symmetrical bis-(extra-coordinate siliconates) can readily be prepared by reacting 1 mole of a diamine with 2 moles of an alkyl or aryltrimethoxysilane and 4 moles of pyrocatechol.

The amine-yielding organic-substituted ammonium salts which can be used in accordance with this invention have the general formulae

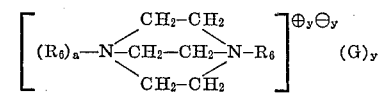

where R₆ is selected from hydrogen, alkyl, haloalkyl, oxoalkyl, cycloalkyl, aryl, alkaryl, aralkyl, benzoyl and arylacyl radicals; G is selected from halogen, haloacetate, and arylsulfonate radicals; y is an integer from 1 to 2; when y=1 a is 0 and when y=2 a is 1;

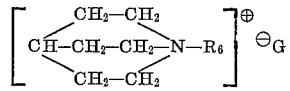

where R₆ and G are as defined above;

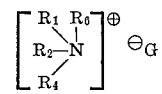

where R₁, R₂, R₄, R₆ and G are as defined above; and

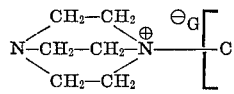

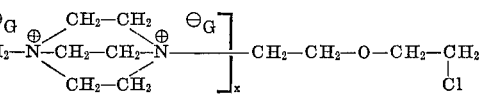

where G is as defined above. Examplary amine-yielding organic-substituted ammonium salts which can be used in the process of this invention are the triethylenediamine containing ammonium halide salts, such as 1-butyl-4-aza-1-azoniabicyclo[2,2,2]octane chloride,
1-benzyl-4-aza-1-azoniabicyclo[2,2,2]octane chloride,
1,4-di phenacyl-1,4-di azoniabicyclo[2,2,2]octane dichloride,
1-benzoyl-4-aza-1-azoniabicyclo[2,2,2]octane chloride,
1-chloromethyl-4-aza-1-azoniabicyclo[2,2,2]octane chloride,
1-ethyl-4-aza-1-azoniabicyclo[2,2,2]octane bromide, and the like;

the triethylenediamine containing ammonium haloacetate salts, such as 1-azonia - 4 - azabicyclo[2,2,2]octane trichloroacetate, 1-azonia-4-azabicyclo[2,2,2]octane diiodoacetate, 1,4 - di azoniabicyclo[2,2,2]octane bis(dichloroacetate), 1,4-di azoniabicyclo[2,2,2]octane bis(trichloroacetate, 1-azonia - 4 - azabicyclo[2,2,2]octane dichloroacetate, and the like; the triethylene diamine containing ammonium arylsulfonate salts, such as 1-azonia-4-azabicyclo[2,2,2]octane p-toluene sulfonate, and the like; the quinuclidine containing ammonium halide salts, such as 1-benzyl-1-azoniabicyclo[2,2,2]octane chloride and the like; the quinuclidine-containing ammonium haloacetate salts, such as 1 - azoniabicyclo[2,2,2]octane trichloroacetate, and the like; the alkyl substituted ammonium halide salts such as 2-bromoethyl trimethyl ammonium bromide, tetramethylammonium chloride, tetraethylammonium bromide, tetra-n-butylammonium iodide, cyclohexyltrimethylammonium chloride, phenyltrimethylammonium bromide, and the like; the alkyl substituted ammonium haloacetate salts, such as triethylammonium trichloroacetate, tetramethylammonium dichloroacetate, tetraethylammonium difluoroacetate, and the like, the alkyl substituted ammonium arylsulfonate salts, such as tetramethylammonium p-toluenesulfonate, diethylammonium p-toluenesulfonate, and the like; and copolymers obtained from the condensation of triethylenediamine and bis-(chloroethyl) ether. The general preparation of amine-yielding organic substituted ammonium salts is well known and described in the prior art.

Varied amounts of the three basic ingredients can be employed, depending upon the degree of cross-linking desired, the nature of the unsaturated polymer, etc. In general the amount of nitrile N-oxide or nitrile imine precursor employed (based on the weight of the polymer) will be from about 0.1% to about 30%, preferably from about 1% to about 10%. The ammonia- or amine-yielding compound will be present in amounts sufficient to convert the precursor to the corresponding nitrile N-oxide or nitrile imine, preferably in an excess of from about 1% to about 30% over that required to convert the precursor.

The cross-linkable compositions of this invention can be prepared by blending or admixing the ingredients in any desired fashion. For example, the unsaturated polymer and precursor can be dissolved in an anhydrous volatile solvent therefor and then admixed with the ammonia- or amine-yielding compound plus any other materials. After mixing, the solvent can be removed under reduced pressure.

It may be desirable in certain cases to modify the compositions by partially reacting the precursor with the polymer. For example, a bis(carbohydroximoyl chloride) can be treated with sufficient ammonia- or amine-yielding compound to only convert approximately half of the hydroximoyl chloride groups to nitrile N-oxide groups. When this treatment is conducted in the presence of the unsaturated polymer, the nitrile N-oxide groups will add onto the polymer at its double bonds, producing an unsaturated polymer substituted with carbohydroximoyl chloride substituents. Additional ammonia- or amine-yielding compound can be added to the carbohydroximoyl chloride substituted polymer. The resulting composition is stable until heated, at which time the hydroximoyl chloride groups convert to nitrile N-oxide groups which cross-link the polymer.

In addition to the three basic ingredients, other additives can be incorporated. Typical additives are fillers such as carbon black, titanium dioxide, silica, diatomaceous earth, talc, etc.; plasticizers such as phthalates, adipates, sebacates, fatty acid esters of pentaerythritol, fatty acid esters of dipentaerythritol, etc.; stabilizers; adhesive promoters; pigments; and so forth. Obviously there are many cases in which other additives are not required or desired, and excellent results are achieved when only the basic ingredients are employed.

As indicated above, cross-linking is initiated by heating the above-described composition. The specific conditions required for cross-linking depend upon the ammonia- or amine-yielding compound. In general, the compositions will be cross-linked by heating at a temperature from about 60° C. to about 250° C. for a period of from about 15 minutes to about 60 minutes. The compositions are relatively stable and can be stored at room temperature for months with little or no detectable cross-linking.

The compositions of this invention are useful in numerous applications. For example, they can be used as one component sealants such as caulking compositions which are fluid enough to extrude into a joint from a caulking gun but will not flow once placed in the joint and which cross-link on heating. Another use is as an adhesive. Compositions of this invention are excellent adhesives for bonding glass, metal, wood, plastics, fibers, fabrics, etc. Another use is in coating compositions. Still another use is in rubber casting or molding. Further uses will be apparent to those skilled in the arts.

The following examples will further illustrate the compositions of this inventon. All parts and percentages are by weight unless noted otherwise.

EXAMPLE 1

This example illustrates the cross-linking of unsaturated mixed polyurethanes by initiation with an ammonia-yielding metal coordination compound.

To a three-roll mill was added 5 parts of a branched chain polyurethane having a molecular weight of approximately 5,000 and having been prepared from allyl alcohol, toluene diisocyanate, and a propylene oxide adduct of trimethylolpropane, 90 parts of a linear chain polyurethane prepared from allyl alcohol, toluene diisocyanate, and the propylene oxide adduct of propylene glycol having a molecular weight of approximately 15,000 and 3 parts of bis(phenylglyoxylohydroximoyl chloride). The mixture was milled at a temperature of 25° C. until homogeneous (approximately 15 minutes). To 10 parts of the polyurethane-hydroximoyl chloride mixture was added 0.995 part of chloropentammine chromium (III) chloride. The resulting mixture was milled until a homogeneous paste was obtained. A sample of the above composition was placed in a jar and stored for two months at room temperature. At the end of this period the material was removed from the jar and examined. The stored composition was unchanged from the original material.

Another sample of the above composition was heated to a temperature of 160° C. for 15 minutes. The product was a tough, cross-linked rubber insoluble in tetrahydrofuran, methylene chloride, and benzene. A control sample, treated in the same way except for the addition of the ammonia-yielding metal coordination compound was completely soluble in tetrahydrofuran, methylene chloride, and benzene.

EXAMPLE 2

This example illustrates the cross-linking of unsaturated mixed polyurethanes by initiation with an amine-yielding metal coordination compound.

To 10 parts of the polyurethane-hydroximoyl chloride mixture described in Example 1 was added 1.0 part of tris-(ethylenediamine) chromium (III) sulfate. The mixture was milled until homogeneous. Samples of the resulting composition were stored at room temperature for 2 months with no detectable change. Another sample of the composition was cross-linked to an insoluble tough rubber by heating for ½ hour at a temperature of 110° C.

EXAMPLE 3

This example illustrates the cross-inking of unsaturated mixed polyurethanes by initiation with another amine-yielding metal coordination compound.

The procedure of Example 2 was repeated with substitution of tris(ethylenediamine) cobalt (III) chloride for tris(ethylenediamine) chromium (III) sulfate. Samples of the composition were stored at room temperature for 2 months with no detectable change. Another sample of the composition was cross-linked to an insoluble tough rubber by heating ½ hour at a temperature of 160° C.

EXAMPLE 4

This example illustrates the cross-linking of butyl rubber by initiation with an ammonia-yielding metal coordination compound.

To 100 parts of butyl rubber (isobutylene-isoprene copolymer) having a molecular weight of approximately 10,000 and containing 7 double bonds per polymer chain was added 14 parts of isophthaloyl bis(phenylhydrazide chloride) and 100 parts of tetrahydrofuran. The resulting mixture was stirred until the butyl rubber and hydrazide chloride went into solution. At this time the tetrahydrofuran was removed under reduced pressure and 10 parts of chloropentammine chromium (III) chloride added. The composition was milled until a homogeneous paste was obtained. Samples of the resulting composition were stored at room temperature for 2 months with no detectable change. Another sample of the composition was cross-linked by heating for ½ hour at a temperature of 160° C. A control sample containing no coordination compound was heated for ¼ hour as described above. The thus-treated material was completely soluble in hexane.

EXAMPLE 5

This example illustrates the cross-linking of a tri-unsaturated urethane copolymer by initiation with an ammonia-yielding metal coordination compound.

To 26.1 parts of a triunsaturated urethane copolymer having a molecular weight of approximately 5000 and having been prepared from poly(propylene oxide) triol, toluene diisocyanates and allyl alcohol was added 2.9 parts of bis(phenylglyoxylohydroximoyl chloride) and 2.98 parts of hexammine nickel tetrafluoroborate,

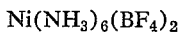

$$Ni(NH_3)_6(BF_4)_2$$

The mixture was milled at room temperature until homogeneous. A sample of the above composition was placed in a jar and stored for several weeks at room temperature. At the end of this time the sample was removed from the jar and found to be unchanged from the original material.

Another sample of the above composition was heated to a temperature of 120° C. for 10 minutes. The product was a tough, cross-linked rubber, insoluble in tetrahydrofuran. A control sample, treated in the same way except for the addition of the ammonia-yielding metal coordination compound was completely soluble in tetrahydrofuran.

EXAMPLE 6

This example illustrates the cross-linking of unsaturated mixed polyurethanes by initiation with an amine-yielding extra-coordinate siliconate salt.

To 15.6 parts of the polyurethane-hydroximoyl chloride mixture described in Example 1 was added 1.3 parts of triethylammonium di(o-phenylenedioxy)phenyl siliconate. The mixture was milled until homogeneous. The resulting paste could be stored at room temperature for several months with no detectable cross-linking. On heating a sample of the composition to 140° C. for ½ hour, a tough, insoluble rubber resulted.

EXAMPLE 7

This example illustrates the cross-inking of an unsaturated polyester by initiation with an amine-yielding extra-coordinate siliconate salt.

A solution of 10 parts of a polyester made from dimer acid, maleic anhydride, and diethylene glycol having a molecular weight of approximately 2,700, an acid number of 4, an ester number of 242, a hydroxyl number of 45, and containing approximately 10.3% fumarate ester, and 2.5 parts of isophthaloyl bis(phenylhydrazide chloride) in 50 parts of tetrahydrofuran was prepared. The solution was agitated to insure a thorough mixing of the ingredients and then the tetrahydrofuran removed under reduced pressure. The residue was milled with 5.0 parts of ethyldiammonium bis[di(o - phenylenedioxy) - phenyl siliconate] until a homogeneous paste was obtained. A sample of the paste was cured to a tough, insoluble rubbery solid by heating for ½ hour at a temperature of 120° C. Samples could be stored at room temperature for months with no detectable cross-linking.

EXAMPLE 8

This example illustrates the cross-linking of mixed polyurethanes by initiation with an amine-yielding extra-coordnate siliconate salt.

To 16.1 parts of the polyurethane-hydroximoyl chloride mixture described in Example 1 was added 1.57 parts of benzyldimethylammonium di(o - phenylenedioxy)phenylsiliconate. The mixture was milled until homogeneous. Samples of the resulting composition were stored at room temperature for 2 months with no detectable change. Another sample of the composition was cross-linked to an insoluble, tough rubber by heating for 45 minutes at a temperature of 160° C.

EXAMPLE 9

This example illustrates the cross-linking of unsaturated mixed polyurethanes by initiation with an amine-yielding extra-coordinate siliconate salt.

To a modified dough mixer was added, under an atmosphere of nitrogen, 30 parts of a mixture comprising 79% of a linear, diunsaturated urethane copolymer having a molecular weight of 15,000, 9.13% of a branched triunsaturated urethane copolymer having a molecular weight of 5,000, 3.35% of bis(phenylglyoxylohydroximoyl chloride), 7.68% of a thixotropic agent, and 0.96% of an antioxidant. To the above mixture was added 5 parts of 1-azonia-bicyclo [2,2,2]octane di(o-phenylenedioxy)phenylsiliconate and the whole mixture milled for 30 minutes. A sample of the resulting smooth paste stored for several weeks at room temperature was found to be unchanged from the original material.

Another sample of the above paste was heated to a temperature of 140° C. for 30 minutes. The product was a cross-linked rubber, insoluble in tetrahydrofuran.

EXAMPLE 10

This example illustrates the cross-linking of unsaturated mixed polyurethanes by initiation with an amine-yielding organic substituted ammonium halide salt.

To a mixture of 18.66 parts of a linear diunsaturated urethane copolymer having a molecular weight of approximately 25,000 and having been prepared from poly(propyleneoxide) diol, toluene diisocyanate and allyl alcohol and 2.5 parts of the triunsaturated urethane copolymer described in Example 5 was added 0.7 part bis(phenylglyoxylohydroximoyl chloride) and 0.674 part of 1-chloromethyl-4-aza-1-azonia-bicyclo [2,2,2] octane chloride. The mixture was milled at room temperature under an anhydrous atmosphere until homogeneous. A sample of the above composition stored for several weeks at room temperature was found to be unchanged from the original material.

Another sample of the above composition was heated to a temperature of 160° C. for 30 minutes. The product was a tough, cross-linked rubber, insoluble in tetrahydrofuran.

EXAMPLE 11

This example illustrates the cross-linking of unsaturated mixed polyurethanes by initiation with an amine-yielding organic substituted ammonium halide salt.

To 17.6 parts of the mixed polyurethanes described in Example 10 was added 0.58 part bis(phenylglyoxylohydroximoyl chloride) and 0.714 part of 1-benzyl-4-aza-1-azonia-bicyclo [2,2,2] octane chloride. The mixture was milled as described in Example 10 and heated to a temperature of 140° C. for 45 minutes. The product was a tough, cross-linked rubber, insoluble in tetrahydrofuran.

EXAMPLE 12

This example illustrates the cross-linking of unsaturated mixed polyurethanes by initiation with an amine-yielding organic substituted ammonium halide salt.

To a modified dough mixer was added, under an atmosphere of nitrogen, 29.5 parts of a mixture comprising 79% of a linear, diunsaturated urethane copolymer having a molecular weight of 15,000, 9.13% of a branched, triunsaturated urethane copolymer having a molecular weight of 5000, 3.35% of bis(phenylglyoxylohydroximoyl chloride), 7.68% of a thixotropic agent, and 0.96% of an antioxidant. To the above mixture was added 2.3 parts of finely ground 1,4-di-phenacyl-1,4-di- azonia-bicyclo [2,2,2] octane dichloride and the whole mixture was then milled for 30 minutes. A sample of the resulting smooth paste stored for 3 weeks at room temperature was found to be unchanged from the original material.

Another sample of the above paste was heated to a temperature of 120° C. for 30 minutes. The product was a cross-linked rubber, insoluble in tetrahydrofuran.

EXAMPLE 13

This example illustrates the cross-linking of unsaturated mixed polyurethanes by initiation with an amine-yielding organic substituted ammonium haloacetate salt.

To a modified dough mixer was added under an atmosphere of nitrogen, 31.9 parts of the mixture of unsaturated urethane copolymers, cross-linking agent, thixotropic agent and antioxidant described in Example 12. To the above mixture was added 1.2 parts of 1-azonia-4-aza-bicyclo [2,2,2] octane trichloroacetate and the whole mixture milled for 30 minutes. A sample of the resulting tan paste stored for 6 weeks at room temperature was found to be unchanged.

Another sample of the above paste was heated for 8 minutes at a temperature of 120° C. The paste turned into a tough, cross-linked, rubbery foam, insoluble in tetrahydrofuran.

EXAMPLE 14

This example illustrates the cross-linking of unsaturated mixed polyurethanes by initiation with an amine-yielding organic substituted ammonium haloacetate salt.

To a modified dough mixer was added, under an atmosphere of nitrogen, 30.5 parts of the mixture of unsaturated urethane copolymers, cross-linking agent, thixotropic agent and antioxidant described in Example 12. To the above mixture was added 1.2 parts of 1-azonia-4-azabicyclo [2,2,2] octane dichloroacetate and the whole mixture milled for 30 minutes.

A sample of the resulting paste was heated for 90 minutes at a temperature of 105° C. The resulting product was a tough rubber insoluble in tetrahydrofuran.

Other samples of the above paste were placed in three ¼ inch aluminum tubes closed at one end. The tubes were immersed in an oil bath maintained at a temperature of 150° C. for 2 minutes, 1 minute and ½ minute, respectively. The samples in each tube were cross-linked to an insoluble rubber.

EXAMPLE 15

This example illustrates the cross-linking of unsaturated mixed polyurethanes by initiation with an amine-yielding organic substituted ammonium arylsulfonate salt.

To a modified dough mixer was added, under an atmosphere of nitrogen, 51.2 parts of the mixture of unsaturated urethane copolymers, cross-linking agent, thixotropic agent and antioxidant described in Example 12. To the above mixture was added 3.03 parts of tetraethyl ammonium p-toluene sulfonate and the mixture milled until homogeneous. A sample of the resulting brown paste, stored for several months at room temperature was found to be unchanged.

Another sample of the above paste was heated for 30 minutes at a temperature of 140° C. The product was a tough, cross-linked rubber, insoluble in tetrahydrofuran.

EXAMPLE 16

This example illustrates the cross-linking of unsaturated mixed polyurethanes by initiation with an amine-yielding organic substituted ammonium halide salt.

To a modified dough mixer was added, under an atmosphere of nitrogen, 30.3 parts of the mixture of unsaturated urethane copolymers, cross-linking agent, thixotropic agent and antioxidant described in Example 12. To the above mixture was added 1.6 parts of 1-benzyl-1-azonia-bicyclo [2,2,2] octane chloride and the whole mixture milled for 1 hour. A sample of the resulting tan paste, stored for several weeks at room temperature was found to be unchanged.

Another sample of the above paste was heated for 30 minutes at a temperature of 140° C. The product was a tough cross-linked rubber, insoluble in tetrahydrofuran.

EXAMPLE 17

This example illustrates the cross-linking of unsaturated mixed polyurethanes by initiation with an amine-yielding organic substituted ammonium halide salt.

To a modified dough mixer was added, under an atmosphere of nitrogen, 51.4 parts of the mixture of unsaturated urethane copolymers, cross-linking agent, thixotropic agent and antioxidant described in Example 12. To the above mixture was added 3 parts of (2-bromoethyl) trimethyl ammonium bromide and the mixture milled until a homogeneous paste was obtained. A sample of the resulting paste, stored for several weeks at room temperature was found to be unchanged.

Another sample of the above paste was heated for 30 minutes at a temperature of 140° C. The product was a tough, cross-linked rubber, insoluble in tetrahydrofuran.

EXAMPLE 18

This example illustrates the cross-linking of unsaturated mixed polyurethanes by initiation with an amine-yielding organic substituted ammonium halide salt.

To a mixture of 12.04 parts of the linear diunsaturated urethane copolymer described in Example 10 and 1.6 parts of the triunsaturated urethane copolymer described in Example 5 was added 0.45 part bis(phenylglyoxylohydroximoyl chloride) and 0.29 part of tetramethyl ammonium chloride. The mixture was milled at room temperature under an anhydrous atmosphere until homogeneous. A sample of the above composition stored for several weeks at room temperature was found to be unchanged from the original material.

Another sample of the above composition was heated to a temperature of 180° C. for 60 minutes. The product was a tough, cross-linked rubber, insoluble in tetrahydrofuran.

EXAMPLES 19–21

These examples illustrate the cross-linking of unsaturated mixed polyurethanes by initiation with different amine-yielding organic substituted ammonium halide salts.

In each case the mixed copolymers described in Example 18 were milled with bis(phenylglyoxylohydroximoyl chloride) and an amine-yielding organic substituted ammonium halide salt under an anhydrous atmosphere, at room temperature until homogeneous. The amounts of each ingredient, cross-linking temperature and time are tabulated below:

|  | 19 | 20 | 21 |
|---|---|---|---|
| Mixed urethane copolymers | 13.04 | 16.34 | 13.2 |
| Bis(phenylglyoxylhydroximoyl chloride) | 0.43 | 0.54 | 0.44 |
| Phenyl trimethylammonium bromide | 0.56 | | |
| Tetraethyl ammonium bromide | | 0.75 | |
| Tetra-n-butyl ammonium iodide | | | 0.92 |
| Cross-linking temperature, °C | 150 | 160 | 140 |
| Cross-linking time, minutes | 60 | 30 | 30 |

In each case the material cross-linked to a tough rubber, insoluble in tetrahydrofuran. Samples of the uncross-linked materials stored for several weeks at room temperature were found to be unchanged.

EXAMPLE 22

This example illustrates the cross-linking of unsaturated mixed polyurethanes by initiation with an amine-yielding organic substituted ammonium halide salt copolymer.

To a modified dough mixer was added, under an atmosphere of nitrogen, 31.6 parts of the mixture of unsaturated urethane copolymers, cross-linking agent, thixotropic agent and antioxidant described in Example 12. To the above mixture was added 1.1 parts of a white, rubbery, solid copolymer obtained from the condensation of triethylenediamine with bis(chloroethyl) ether and the whole mixture milled until a homogeneous paste was obtained. A sample of the resulting paste, stored for several weeks at room temperature was found to be unchanged.

Another sample of the above paste was heated for 60 minutes at a temperature of 150° C. The product was a tough cross-linked rubber, insoluble in tetrahydrofuran.

EXAMPLE 23

This example illustrates the cross-linking of unsaturated mixed polyurethanes by initiation with an amine-yielding extra-coordinate siliconate salt.

To 14.1 parts of a mixture comprising 74% of the

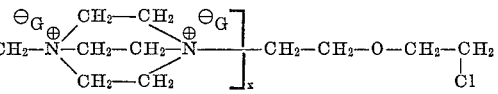

linear diunsaturated urethane copolymer described in Example 10, 9.8% of the triunsaturated urethane copolymer described in Example 5, 3.21% of bis(phenylglyoxylohydroximoyl chloride) and 13% xylene was added 1.14 parts of 4-aza-1-azonia bicyclo [2,2,2] octane di(o-phenylenedioxy) phenyl siliconate. The mixture was milled at room temperature under an anhydrous atmosphere until homogeneous. A sample of the above composition stored for several weeks at room temperature was found to be unchanged from the original material.

Another sample of the above composition was heated to a temperature of 120° C. for 30 minutes. The product was a tough cross-linked rubber, insoluble in tetrahydrofuran.

The letter $x$ in the formula of the copolymer in column 14 is an integer greater than 1, preferably 2–10.

What I claim and desire to protect by Letters Patent is:
1. A cross-linkable composition comprising
   (a) a polymer containing ethylenic unsaturation,
   (b) an ammonia- or amine-yielding compound selected from ammonia- or amine-yielding coordination compounds of the metals of atomic numbers 22 through 30, ammonia- or amine-yielding extra-coordinate siliconate salts having the general formula

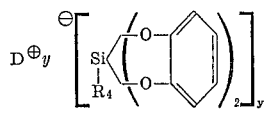

where $R_4$ is selected from alkyl, cycloalkyl, aryl, aralkyl and alkaryl radicals; $y$ is an integer from 1 to 2; when $y=1$ D is a radical selected from

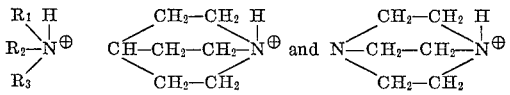

where $R_1$, $R_2$, and $R_3$ are selected from hydrogen, alkyl, cycloalkyl, aryl, aralkyl, and alkaryl radicals; when $y=2$ D is a radical selected from

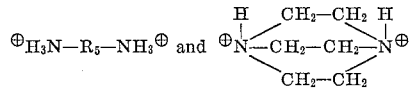

where $R_5$ is an alkylene radical containing 2 to 10 carbon atoms, and amine-yielding organic substituted ammonium salts having the general formulae selected from

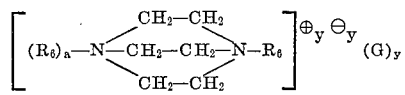

where $R_6$ is selected from hydrogen, alkyl, haloalkyl, oxoalkyl, cycloalkyl, aryl, alkaryl, aralkyl, benzoyl and arylacyl radicals; G is selected from halogen, haloacetate, and arylsulfonate radicals; $y$ is an integer from 1 to 2; when $y=1$ $a$ is 0 and when $y=2$ $a$ is 1;

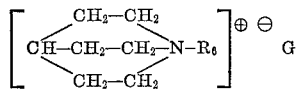

where $R_6$ and G are as defined above;

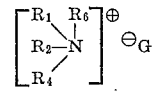

where $R_1$, $R_2$, $R_4$, $R_6$ and G are as defined above; and where G is as defined above; in an amount at least sufficient to convert the precursor of (c) to the corresponding nitrile N-oxide or nitrile imine and up to an excess of about 30% and
(c) from about 0.1% to about 30%, based on the weight of the polymer of a precursor of a polyfunctional nitrile N-oxide or nitrile imine having the formula selected from the group consisting of

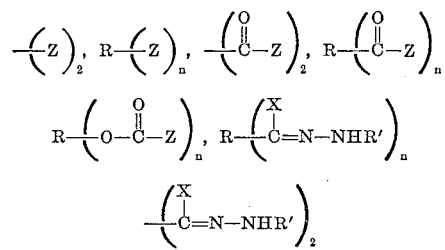

and

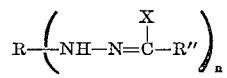

wherein Z is

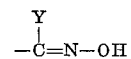

Y is a substituent of the group consisting of —NO₂ and halide radicals, R is an organic radical selected from the group consisting of hydrocarbon radicals, halogenated hydrocarbon radicals, hydrocarbon-oxy-hydrocarbon radicals, hydrocarbon-thio-hydrocarbon radicals and hydrocarbon-sulfonyl-hydrocarbon radicals, R' is a radical selected from the group consisting of hydrogen, alkyl, cycloalkyl, aryl, alkaryl, and aralkyl radicals, R'' is a radical selected from the group consisting of alkyl, cycloalkyl, aryl, alkaryl, and aralkyl radicals, X is a halide radical, and $n$ is an integer greater than 1.

2. The composition of claim 1 wherein the precursor is bis(phenylglyoxylohydroximoyl chloride).

3. The composition of claim 1 wherein the ammonia- or amine-yielding coordination compound of metal is hexammine nickel tetrafluoroborate.

4. The composition of claim 1 wherein the ammonia- or amine-yielding coordination compound of metal is tris(ethylenediamine)chromium (III) sulfate.

5. The composition of claim 1 wherein the ammonia- or amine-yielding extra-coordinate siliconate salt is 4-aza-1-azonia bicyclo [2,2,2] octane di(o-phenylenedioxy) phenyl siliconate.

6. The composition of claim 1 wherein the ammonia- or amine-yielding extra-coordinate siliconate salt is ethylenediammonium bis[di(o-phenylenedioxy)phenyl siliconate].

7. The composition of claim 1 wherein the amine-yielding extra-coordinate siliconate salt is triethylammonium di(o-phenylenedioxy)phenyl siliconate.

8. The composition of claim 1 wherein the amine-yielding organic substituted ammonium salt is 1,4-di-phenacyl-1,4-di-azonia-bicyclo [2,2,2] octane dichloride.

9. The composition of claim 1 wherein the amine-yielding organic substituted ammonium salt is tetra-n-butyl butyl ammonium iodide.

10. The composition of claim 1 wherein the amine-yielding organic substituted ammonium salt is 4-aza-1-azonia-bicyclo [2,2,2] octane trichloroacetate.

11. The composition of claim 1 wherein the polymer containing ethylenic unsaturation is a mixture of straight and branched chain unsaturated polyurethane.

12. The composition of claim 1 wherein the polymer containing ethylenic unsaturation is butyl rubber.

13. The composition of claim 1 wherein the polymer containing ethylenic unsaturation is an unsaturated polyester.

14. In a process of cross-linking a polymer containing ethylenic unsaturation which comprises heating said polymer in admixture with from about 0.1% to about 30%, based on the weight of the polymer of a precursor of a polyfunctional nitrile N-oxide or nitrile imine having the formula selected from the group consisting of $$-(Z)_2, R-(Z)_n, -\left(\overset{O}{\underset{\parallel}{C}}-Z\right)_2, R-\left(\overset{O}{\underset{\parallel}{C}}-Z\right)_n, R-\left(O-\overset{O}{\underset{\parallel}{C}}-Z\right)_n$$

$$R-\left(\overset{X}{\underset{\mid}{C}}=N-NHR'\right)_n, -\left(\overset{X}{\underset{\mid}{C}}=N-NHR'\right)_2,$$

and $$R-\left(NH-N=\overset{X}{\underset{\mid}{C}}-R''\right)_n$$

where Z is $$-\overset{Y}{\underset{\mid}{C}}=N-OH$$

Y is a substituent of the group consisting of $-NO_2$ and halide radicals, R is an organic radical selected from the group consisting of hydrocarbon radicals, halogenated hydrocarbon radicals, hydrocarbon-oxy-hydrocarbon radicals, hydrocarbon-thio-hydrocarbon radicals and hydrocarbon-sulfonyl-hydrocarbon radicals, R' is a radical selected from the group consisting of hydrogen, alkyl, cycloalkyl, aryl, alkaryl, and aralkyl radicals, R'' is a radical selected from the group consisting of alkyl, cycloalkyl, aryl, alkaryl, and aralkyl radicals, X is a halide radical and $n$ is an integer greater than 1, and an initiator to convert said precursor to a nitrile N-oxide or nitrile imine, the improvement of using as an initiator an ammonia- or amine-yielding compound selected from the ammonia- or amine-yielding coordination compounds of the metals of atomic numbers 22 through 30, ammonia- or amine-yielding extra-coordinate siliconate salts having the general formula $$D^{\oplus}y\left[\overset{\ominus}{\underset{R_4}{Si}}\left(\overset{O}{\underset{O}{\diagdown}}\right)_2\right]_y$$

where $R_4$ is selected from alkyl, cycloalkyl, aryl, aralkyl and alkaryl radicals; $y$ is an integer from 1 to 2; when $y=1$ D is a radical selected from $$\overset{R_1}{\underset{R_3}{R_2-\overset{\mid}{\underset{\mid}{N}}^{\oplus}-H}}, \quad \overset{CH_2-CH_2}{\underset{CH_2-CH_2}{CH-CH_2-CH_2-\overset{\diagup}{\underset{\diagdown}{N}}^{\oplus}}}H \text{ and } \overset{CH_2-CH_2}{\underset{CH_2-CH_2}{N-CH_2-CH_2-\overset{\diagup}{\underset{\diagdown}{N}}^{\oplus}}}H$$

where $R_1$, $R_2$, and $R_3$ are selected from hydrogen, alkyl, cycloalkyl, aryl, aralkyl, and alkaryl radicals; when $y=2$ D is a radical selected from $$\oplus H_3N-R_5-NH_3^{\oplus} \text{ and } \overset{H}{\underset{CH_2-CH_2}{\oplus N-CH_2-CH_2-N^{\oplus}}}\overset{H}{}$$

where $R_5$ is an alkylene radical containing 2 to 10 carbon atoms, and amine-yielding organic substituted ammonium salts having the general formulae selected from $$\left[(R_6)_a-\overset{CH_2-CH_2}{\underset{CH_2-CH^2}{N-CH_2-CH_2-N}}-R_6\right]^{\oplus y} \ominus y \quad (G)_y$$

where $R_6$ is selected from hydrogen, alkyl, haloalkyl, oxoalkyl, cycloalkyl, aryl, alkaryl, aralkyl, benzoyl and arylacyl radicals; G is selected from halogen, haloacetate, and arylsulfonate radicals; $y$ is an integer from 1 to 2; when $y=1$ $a$ is 0 and when $y=2$ $a$ is 1;

$$\left[\overset{CH_2-CH_2}{\underset{CH_2-CH_2}{CH-CH_2-CH_2-N}}\right]^{\oplus} \ominus \text{ G}$$

where $R_6$ and G are as defined above;

$$\left[\overset{R_1}{\underset{R_4}{R_2-\overset{R_6}{\underset{\diagdown}{N}}}}\right]^{\oplus} \ominus g$$

where $R_1$, $R_2$, $R_4$, $R_6$ and G are as defined above; and $$\overset{\ominus G}{\underset{CH_2-CH_2}{\oplus}}\overset{CH_2-CH_2}{\underset{CH_2-CH_2}{N-CH_2-CH_2-N^{\oplus}}}\overset{\ominus G}{}\left[-CH_2-CH_2-O-CH_2-CH_2-\overset{CH_2-CH_2}{\underset{CH_2-CH_2}{N-CH_2-CH^2-N^{\oplus}}}\right]_x -CH_2-CH_2-O-CH_2-\overset{CH_2}{\underset{Cl}{|}}$$

where G is as defined above; in an amount at least sufficient to convert the precursor to the corresponding nitrile N-oxide or nitrile imine and up to an excess of about 30%.

15. The process of claim 14 wherein the ammonia- or amine-yielding coordination compound of metal is hexammine nickel tetrafluoroborate.

16. The process of claim 14 wherein the ammonia- or amine-yielding coordination compound of metal is tris (ethylenediamine)chromium (III) sulfate.

17. The process of claim 14 wherein the ammonia- or amine-yielding extra-coordinate siliconate salt is ethylenediammonium bis - [di(o - phenylenedioxy)phenyl siliconate].

18. The process of claim 14 wherein the ammonia- or amine-yielding extra-coordinate siliconate salt is triethylammonium di(o-phenylenedioxy)phenyl siliconate.

19. The process of claim 14 wherein the ammonia- or amine-yielding extra-coordinate siliconate salt is 4-aza-1- azonia bicyclo [2,2,2] octane di(o-phenylenedioxy)phenyl siliconate.

20. The process of claim 14 wherein the amine-yielding organic substituted ammonium salt is 1,4-di-phenacyl-1,4-diazonia-bicyclo [2,2,2] octane dichloride.

21. The process of claim 14 wherein the amine-yielding organic substituted ammonium salt is tetra-n-butyl ammonium iodide.

22. The process of claim 14 wherein the amine-yielding organic substituted ammonium salt is 4-aza-1-azonia bicyclo [2,2,2] octane trichloroacetate.

References Cited

UNITED STATES PATENTS 3,390,204   6/1968   Breslow _____ 260—83.3

PAUL LIEBERMAN, Primary Examiner

U.S. Cl. X.R.

260—2, 3, 22, 31.6, 31.8, 37, 40, 41, 41.5, 75, 80.78, 83.3, 85.1, 85.3, 86.1, 89.5, 92.3, 94.1, 94.7

PO-1050
(5/69)

UNITED STATES PATENT OFFICE
CERTIFICATE OF CORRECTION

Patent No. ___3,576,908___  Dated ___April 27, 1971___

Inventor(s) ___Karl Brack (Case 10-20)___

It is certified that error appears in the above-identified patent and that said Letters Patent are hereby corrected as shown below:

Column 3, line 25, " trimesoyl " should read
-- trimellitoyl --.

Column 5, line 18, " prime 1 " appearing at the end of the second formula should be deleted.

Column 5, line 30, " +nHC " should read -- +nHCl --.

Column 8, line 70 and Column 9, line 67 in both instances, " cross-inking " should read
-- cross-linking --.

Claim 14, Column 16, formula between lines 42 and 44, following " -N " insert " $-R_6$ ".

Signed and sealed this 7th day of September 1971.

(SEAL)
Attest:

EDWARD M. FLETCHER, JR.
Attesting Officer

ROBERT GOTTSCHALK
Acting Commissioner of Pat(